Aug. 2, 1960
M. NAZZEWSKI
2,947,113
GLASS SEALING APPARATUS
Filed Jan. 13, 1955
2 Sheets-Sheet 1
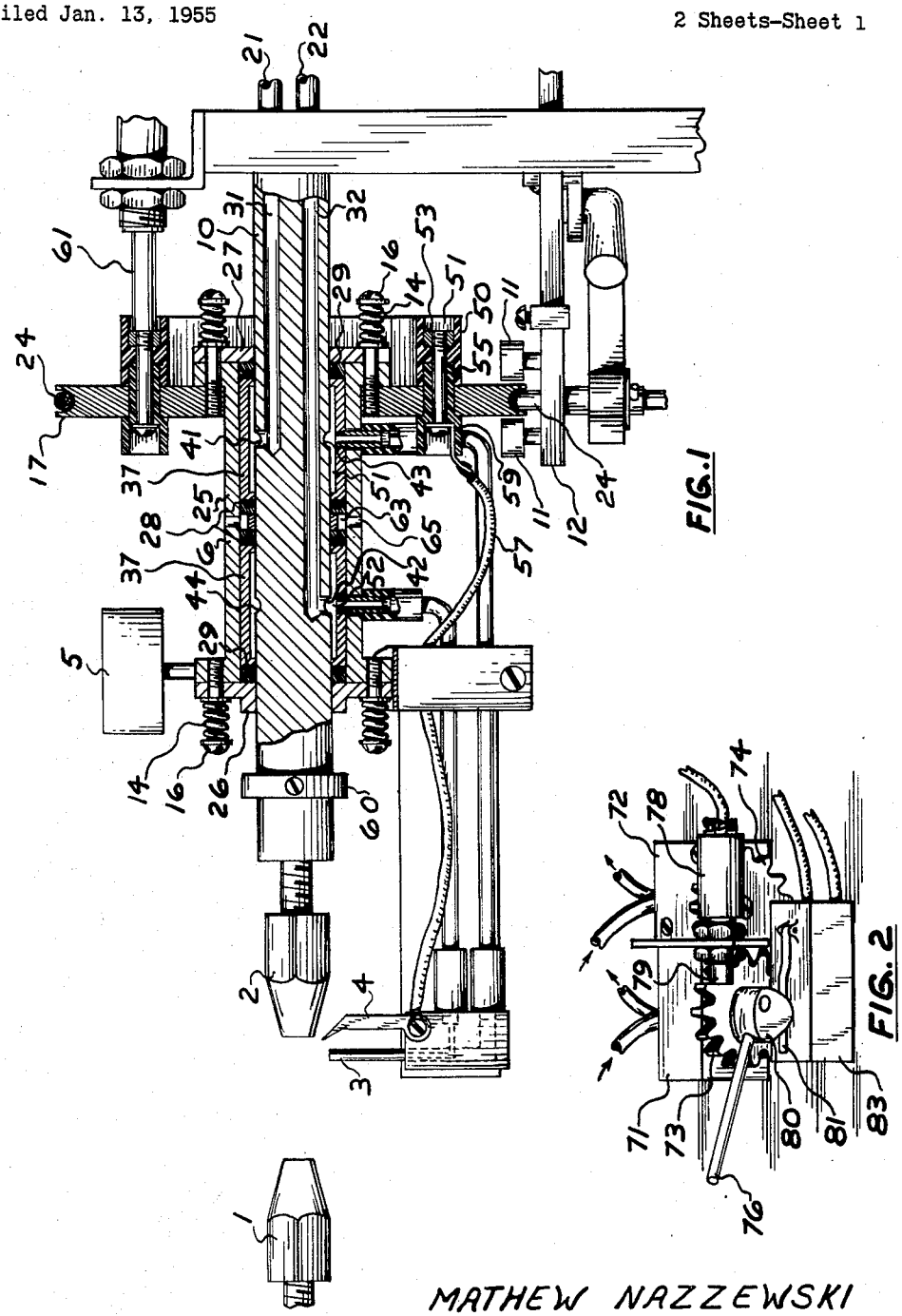
MATHEW NAZZEWSKI
INVENTOR.
BY Connolly and
Hutz Aug. 2, 1960    M. NAZZEWSKI    2,947,113
GLASS SEALING APPARATUS
Filed Jan. 13, 1955    2 Sheets-Sheet 2

MATHEW NAZZEWSKI
    INVENTOR.
BY Connolly and Hutz

United States Patent Office 2,947,113
Patented Aug. 2, 1960

2,947,113
GLASS SEALING APPARATUS

Mathew Nazzewski, Adams, Mass., assignor to Sprague Electric Company, North Adams, Mass., a corporation of Massachusetts Filed Jan. 13, 1955, Ser. No. 481,621

1 Claim. (Cl. 49—1)

The present invention relates to sealing apparatus, and more particularly to apparatus used to seal miniature glass structures for assembly purposes.

Among the objects of the present invention is the provision of a sealing apparatus in which articles of relatively small size are more conveniently handled.

The above, as well as additional objects of the present invention, will be more completely understood from the following description of several of its exemplifications, reference being made to the accompanying drawings, wherein:

Fig. 1 is a view partly in section of one form of sealing device embodying the present invention;

Fig. 2 is a perspective view of a control unit that can be used with the apparatus of Fig. 1 according to the present invention;

Figure 3:
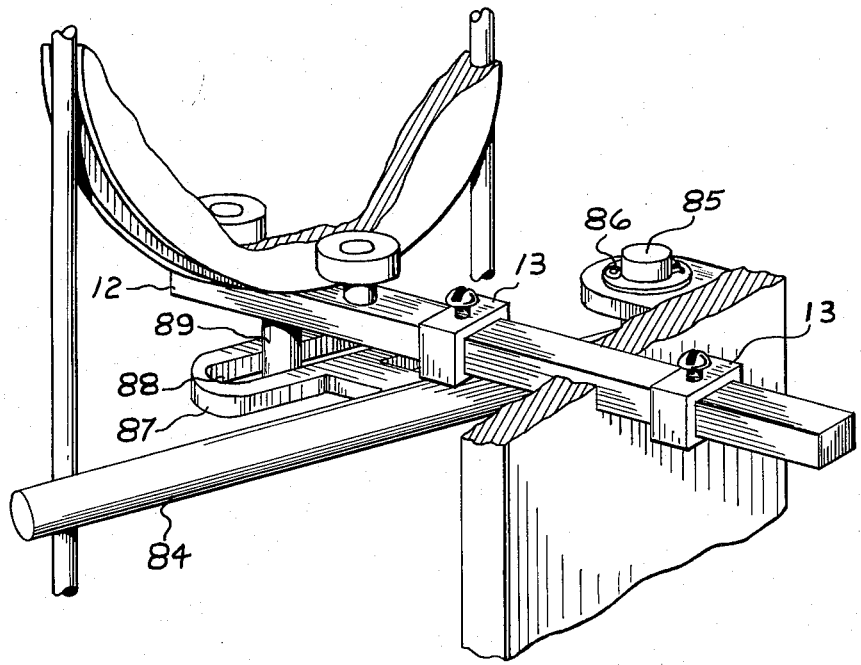
Fig. 3 is a perspective view of the cam assembly for axially shifting the rotating housing of the sealing device.

It has been discovered that very effective sealing of miniature glass articles can be accomplished, particularly with smaller sizes of articles, with an apparatus having a burner mechanism operated to revolve completely around the articles to be sealed, which articles in turn can be held stationary. An electrically fired igniting member can be mounted for rotation with the burner mechanism so as to ignite the burner while it rotates. Inasmuch as with the small articles the size of the burner flame is relatively small, an automatic control can be arranged to fire the igniting member and at the same time automatically increase the rate of supply of combustion material to the mechanism.

In the drawing, Fig. 1 shows a pair of article-holding chucks 1, 2 adjustably held, for example by the threaded supports shown, so as to grip between them articles such as electric circuit components and glass tubes which are to be sealed around the components. The chucks themselves can be made of thermal insulation material such as ceramic material. One of the chucks can be held on a plain support while the other, as shown in the figure, is mounted on a stationary manifold shaft 10.

Shaft 10 is drilled to provide two longitudinally extending passageways 31, 32 separately connected to lines 21, 22, which can supply gas and air or oxygen, respectively. The passageways 31, 32 penetrate into the shaft 10 to different depths, and at longitudinally spaced points communicate with transversely directed exit ports 41, 42, respectively. If desired, the exit ports can have their outer openings flared, and the entire periphery of the shaft can be grooved at those parts, as shown at 43, 44.

Rotatably mounted on shaft 10 is a housing assembly 6 that includes a pulley 17 fixed thereto and arranged to be driven, as by belt 24. A generally cylindrical body portion 25 of the housing is arranged to span the portion of shaft 10 between ports 41, 42 as well as some distance on either side. The body 25 is held in spaced relation to the shaft by retainer rings 26, 27 so as to provide a generally annular space around the shaft at the ports. In the illustrated embodiment this space is divided into a separate zone 51, 52 for each port, as by packing rings 28. Additional packing 29 can be provided at the ends of the body 6 to minimize leakage, if desired. Instead of relying on the packing as the sole tight frictional engagement between the housing and the shaft, spacing rings or tubes 37, 37 of suitable antifrictional material, such as oilite bearing stock, can be fitted between the housing and the shaft, and as shown, can be internally hollowed to provide a manifold or chamber around the respective ports.

External connections to the separate chambers, and penetrating through the body as well as the spacer tubes, deliver the separate streams of gas or oxygen to a burner 3 suitably affixed to the housing so as to be positioned adjacent the space between the chucks 1 and 2. The burner 3 is of two concentric tubes each of which carry the combustion gases. The internal channels for the combustion gases are shown by the dotted lines leading into burner 3. The oxygen or air is carried through the center cylinder so as to provide a combustible mixture through tip mixing with gas carried through the outer tube. For the annealing phase the oxygen pressure is reduced to produce a cooler flame. Where one burner is used, as in the construction of Fig. 1, it may be desirable to counterbalance it as by an opposing weight 5 disposed on the housing diametrically opposite the burner. Also, with a good friction engagement provided, as by the combination of packing 28, 29 and spacer tubes 37, 37, the spacer rings 26, 27 are preferably held in place in a resilient manner as by means of springs 14, 14 clamped by bolts 16, 16 against the sides of the rings, the bolts in turn being threadedly secured in suitably disposed flanges of the body 25 or pulley 17.

Inasmuch as the sealing of the small glass objects generally requires that the burner flame be quite small and the burner tip accordingly be close to the objects being sealed, it is desirable to have a built-in burner igniting mechanism. The built-in igniting mechanism is important, particularly where the lateral spacing between the object and the flame cannot be adjusted during operation as with the device of Fig. 1, as other means of ignition would lead to flame splash and attendant injury to the objects mounted in the chucks 1 and 2. This is shown in Fig. 1 as including a high voltage electrode 4 secured to but insulated from the burner holder and having a point coming into close proximity to the tip of the burner. The burner itself, including its tip, can be made of metal and grounded so as to provide the second electrode for the igniting mechanism. A suitable collector ring arrangement is provided to connect electrode 4 to a high voltage source which, when energized, causes an arc discharge to take place between the adjacent terminals of the electrode 4 and the burner 3.

In the construction of Fig. 1 the collector ring arrangement includes a cylindrical resin annulus 50 which is conveniently fastened to the pulley 17 concentrically and in spaced relation with respect to shaft 10. The annulus 50 is shown as relatively thick walled so as to have fairly wide edge faces of which the one that is exposed is recessed at 51. In this recess is fitted a contact ring 53 of metal for example, held in place by threaded engagement with screws 55 which penetrate through and are clamped against the opposite faces of the pulley 17. One of the screws 55 can also act as an electrical contact, and under its head is secured the end of a conductor 57. To insulate the screws 55 from the pulley, where the pulley is made of electrically conductive material, suitable insulating thimbles 59 can be inserted between the screws and the pulley.

The exposed face of conductor ring 53 is arranged to be flat and in contact with a brush 61 positioned by an insulated holder fixed to a stationary portion of the apparatus so as to penetrate into recess 50 and frictionally engage the exposed conductor ring face.

With the small flames that are used in the above arrangement, it is particularly desirable to have the burner tip adjustably positioned with respect to the space between the chucks. In Fig. 1 the shaft 10 has its cylindrical face arranged to extend axially a greater distance than that spanned by the housing 6. This permits the housing to be slid axially along the shaft and correspondingly carry the burner. A collar 60 on the shaft can be provided to act as a stop to limit the maximum shift of the housing. The shifting can be conveniently arranged as by a roller assembly 12 carrying a pair of rollers 11, 11 engaging opposite faces of pulley 17 adjacent its periphery. The rollers 11, 11 can be resiliently held against the pulley face or can be merely fixed in suitably spaced relation so as to provide a small clearance with respect to these faces. The roller assembly 12 can be adjustably held for shifting to and fro in an axial direction with respect to shaft 10, and is preferably provided with a fine adjustment device for this purpose.

Looking now at Fig. 3 the axial adjustment lever 84 rotates through a limited arc about point 85 where it is secured to framework of the device by washer and cotter pin assembly 86 extending through the lever 84. Branching off from the lever 84 at approximately its midpoint is an arm 87, the end of which contains a slot 88. Sliding within this slot 88 is pin 89 which engages the roller assembly 12. To limit the axial travel to distances less than the limitations imposed by the dimensions of the structure stop blocks 13 are used.

As an added precaution, since the combustible gases may leak past the spacer tubes and the packing, the housing 6 of Fig. 1 has its packing rings 28, 28 spaced apart to provide an intermediate chamber 63 which is directly communicated with the atmosphere by means of a series of ports 65 drilled through the wall of body 25. In this way, any gas leaking out of either chambers 51, 52, will be permitted to escape before it enters the other chamber. The formation of explosive mixtures in the separate chambers is accordingly minimized.

Fig. 2 shows one very desirable form of operating control for the apparatus of Fig. 1. A pair of flow-control valves mounted in valve blocks 71, 72 have separate inlet and outlet lines as shown. The outlet lines can be connected respectively to lines 21, 22 in Fig. 1, the inlet lines being then connected to suitable sources of gas and air or oxygen, respectively. Each of the blocks has a control shaft to which is affixed a separate external gear 73, 74. The blocks are secured together in the assembly in such a way that these gears mesh with each other in such relation that both valves are opened or closed together. A control handle 76 is suitably affixed to one of the gears so that the size of the flame of burner 3 can be carefully set by controlling the flow of combustion gases.

Inasmuch as with very small burner flames the combustion gas flow should be increased to the maximum for better ignition when the burner is first turned on, Fig. 2 shows an automatic igniting arrangement. An ignition switch 78 having a movable plunger 79 is fixed in place alongside the blocks so that the plunger is pushed inwardly by handle 76 when the handle is moved to the maximum gas flow position. The inward motion of the plunger is arranged to close the switch 78 and thereby energize the ignition. Valves can also be arranged so that there is a small amount of overtravel in the maximum gas flow position so that the handle can be retracted somewhat from the plunger pushing engagement and still obtain maximum gas flow. At the same time handle 76 is also provided with a cam 80 and a follower 81 forming part of a control switch 83 connected to energize the rotation of pulley 17 as by a suitably located electrical motor. The cam 80 is shaped so that the switch 83 is kept in open position as long as the gas flow valves are closed. Upon opening of the gas flow valves, however, the cam is rotated sufficiently to permit follower 81, which may be spring biased, to move into switch closing position and thereby start the rotation of the burner. Continued travel of the operating handle in any of the gas flow positions will keep switch 83 closed.

The apparatus described above can be used with the burner rotating around a horizontal axis, vertical axis, or any angle in between. For work pieces that are not too well supported against sagging, as for example when glass tubes about ½ inch or more in diameter are to be sealed around a very thin insert, it is preferred that the axis of the burner rotation be at or close to the vertical.

The burner 3 can be either fixed with respect to the rotation axis, or it can be adjustable. Adjustability is very simply provided by merely having the burner tip slidably telescoped in an adjustable manner into the main body of the burner. Alternatively, this type of adjustment can be provided in such manner that adjustments are effected while the housing rotates. To this end, the burner assembly need only be fitted on the housing so that it can be slid transversely of the rotation axis with the burner assembly carrying a peripheral ring extending entirely around the housing and having an axially directed flange fitted between a second roller assembly similar to that shown at 12 in Fig. 1.

Figure 4:
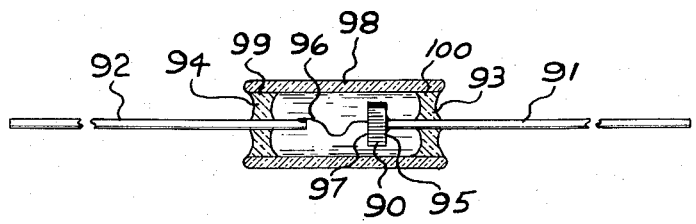
Fig. 4 is an electrical device sealed in glass enclosure with the apparatus of the invention.

Fig. 4 shows the cross-sectional view of a semiconductor diode 90 hermetically sealed in a glass cylinder. In the fabrication of this assembly the leads 91 and 92, preferably of copper clad steel wire, are each bonded to respective annular soft glass ring 93 and 94 by fusion at the surface contact area. The lead 91 is soldered to the semiconductor crystal diode 90 at the surface 95 to produce an ohmic connection. The other electrode 96 is a gold wire welded to surface 97 of the diode 90. Lead 91 with the attached diode 90 is placed in chuck 2 while lead 92 and its ring 94 is placed in chuck 1. A glass tube 98 is slipped over lead 92 after which the electrode 96 is welded to lead 92. The tube 98 is then properly positioned so that it encloses the diode assembly fusion is then caused to occur at points 99 and 100 by the rotating flame in accordance with the teachings of this invention. This device of Fig. 4 represents only one of many sealed elements readily produced by the device of this invention.

This invention makes possible fusion or sealing of elements without the variation in area of incidence of the flame always attendant with a fixed flame. This is particularly a problem where manipulation of the element to be sealed is by hand as with small devices. Further with this device no sagging or distortion of the sealed body results probably again because of the concentration of the flame to a limited area.

As many apparently widely different embodiments of this invention may be made without departing from the spirit and scope hereof, it is to be understood that the invention is not limited to the specific embodiments hereof except as defined in the appended claim.

What is claimed is:

A sealing apparatus for fusing miniature glass structures together, said apparatus having a gripping device for holding the miniature glass structure to be fused, burner mechanism including a burner nozzle mounted for rotation completely around the gripping device to heat and fuse the structure completely around its periphery, driving elements connected to so rotate the burner mechanism, an electrically fired burner ignition assembly including said burner nozzle as one electrode member mounted for rotation with the burner mechanism to ignite the burner while it is rotating, means for axially shifting the position of said rotatable burner nozzle and said rotatable igniting member with respect to said gripping device, a control device comprising a flow control means controlling the rate of supply of combustible material to the burner, a first electric circuit including a first electric switch for controlling the passage of power through said first circuit to the igniting member, a second electric circuit including a second electric switch for permitting the passage of power through said second circuit to the burner driving elements, and an operating member having movement between two extremes; the structural relationship between the components of the control device being such that movement of said operating member from one extreme to the other extreme actuates the second electric switch means to complete said second circuit to said driving elements, the flow control means to supply combustible material to said burner, and the first electric switch means to complete said first circuit to said igniting member.

References Cited in the file of this patent

UNITED STATES PATENTS

| | | |
|---|---|---|
| 1,897,488 | Millar | Feb. 14, 1933 |
| 2,220,066 | Cornell | Nov. 5, 1940 |